April 21, 1953     D. B. SILVERMAN     2,635,898
MOBILE MOVEMENT EQUALIZER
Filed Aug. 13, 1951
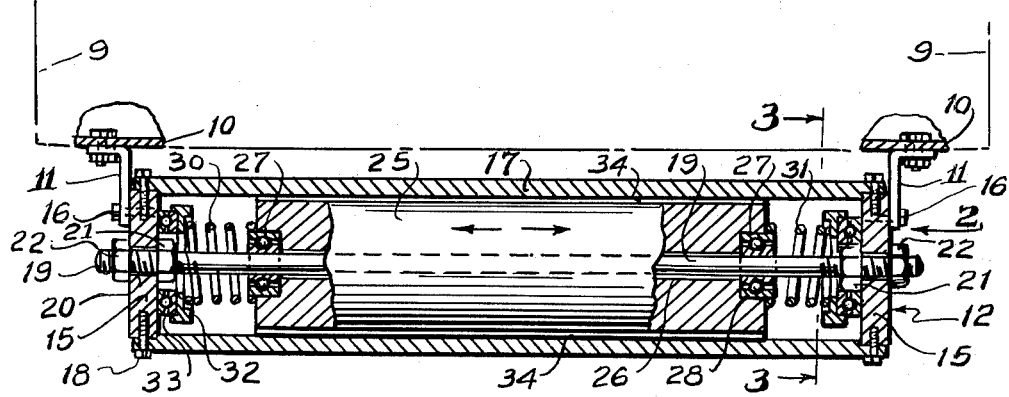
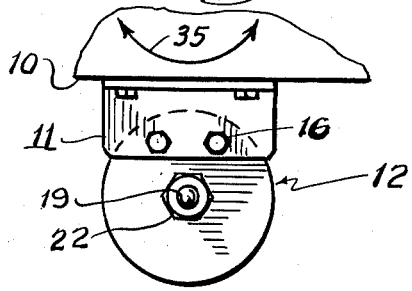
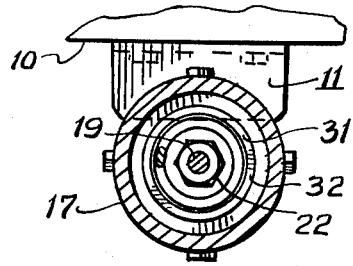
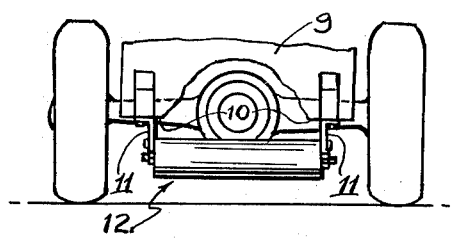
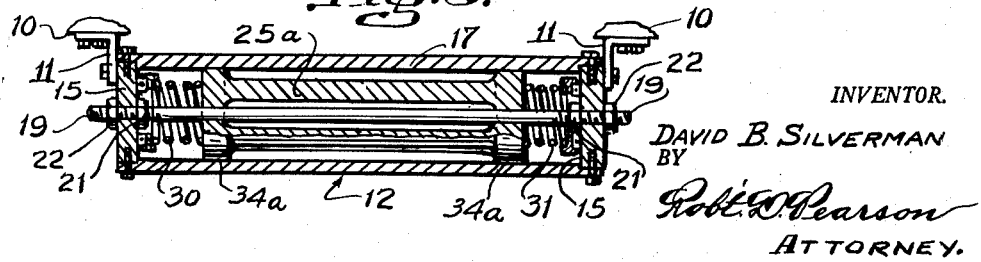
INVENTOR.
DAVID B. SILVERMAN
BY
Robt. W. Pearson
ATTORNEY.

Patented Apr. 21, 1953

2,635,898

UNITED STATES PATENT OFFICE 2,635,898

MOBILE MOVEMENT EQUALIZER

David B. Silverman, Los Angeles, Calif.

Application August 13, 1951, Serial No. 241,615

2 Claims. (Cl. 280—150)

This invention relates to an equalizer automatically to balance automobiles and other moving objects.

Among the objects of this invention are: to provide an improved automatically operating means to resist skidding of automobiles; to provide such a means which will dampen vibration; and to provide an automatically operating means which will more efficiently prevent side hopping and will offset the tendency of a vehicle equipped with the invention from overturning when taking curves, and which will offset side swaying when a vehicle equipped with the device is passing over uneven roadbeds.

It is not broadly new, in the art to which this invention pertains to provide automobiles with means tending to stabilize their movements, but it is a specific object of the present invention to simplify such devices and to render their operation efficient.

Other objects, advantages and features of invention will hereinafter appear.

Referring to the accompanying drawing, illustrative of preferred embodiments of the invention, Fig. 1 is a view, partly in elevation and partly in vertical midsection, illustrating the invention in its attached relation to the under side of an automobile chassis.

Fig. 2 is an end elevation, the viewpoint of the observer being indicated by the arrow designated 2 in Fig. 1.

Fig. 3 is a cross section on line 3—3 of Fig. 1.

Fig. 4 is an end view of the running gear of a self-propelled vehicle illustrating the application of the invention thereto.

Fig. 5 is a vertical midsection of a modification of the invention.

Referring in detail to the drawing, the auto chassis 9 has an underconstruction 10 which includes along each side a horizontally extending angle iron 11. To said angle iron is bolted or otherwise secured an elongated housing 12, said housing spanning the space between said angle irons, and being rigidly held by them in a fixed relation to the chassis.

Said housing 12 may be constructed in a variety of ways without exceeding the scope of the claimed invention, being shown provided at each end with a substantial, circular head 15, the upper part of the exterior face of which abuts the angle iron 11 at its side of the structure, to which angle iron it is shown secured by screws or bolts 16. Said heads 15 are bolted within the end portions of a substantial metal cylinder 17, and a circumferentially extending series of radially positioned screws 18 hold said heads in place within the ends of said cylinder 17.

Axially through said housing 12 extends a shaft 19 which is screwthreaded for a considerable distance from each end. The end portions of said shaft extend centrally through circular apertures 20 in the aforesaid heads 15, and by means of the inner nuts 21 and other nuts 22 said shaft is clamped rigidly to said heads. Said apertures 20 are shown having a slightly greater diameter than said shaft, allowing the latter a slight radial adjustment. After said shaft has been positioned in a truly concentric relation to the housing 12 said outer nuts 22 are screwed down securely to hold the shaft in that position.

Upon said shaft 19 is concentrically mounted a cylindrical weight 25 which has through it an axial bore 26, the diameter of which is somewhat greater than the diameter of said shaft. Said weight is supported in a concentric, slightly spaced relation to said shaft, by twin ball bearing structures 27 which are located in diametrical enlargements 28 of the end portions of said bore 26. Owing to the weight 25 being considerably less in length than the housing 12, each bearing structure 27 is spaced considerably inwardly from the head 15 at the adjacent end of the housing, in a slidable relation to said shaft.

Twin spiral compression springs 30 and 31 are provided which concentrically surround the shaft 13 in radially spaced relations thereto. As viewed in Fig. 1 the spring 30 abuts a seat forming ring 32 which is interposed between said spring and a ball bearing structure 33. This bearing structure being concentric to the shaft 19 and being fastened to the inner face of the head 15 at that end of the housing 12. Said ring is shown having a thickened peripheral portion which adapts its left face to seat upon said bearing structure 33 and adapts its right face to seat the adjacent end of the coil compression spring 30. The opposite end of said spring is kept in place by the projecting end portion of the bearing structure 27 at that end of the weight 25. The parts adjacent to the spring 31 in the opposite end portion of the housing 12 are duplicates of the parts just described and are therefore designated by the same numerals. The aforesaid ball bearing structure 33 toward which the outer ends of the springs 30 are directed prevent said springs from braking the free rotary oscillation of the weight.

Owing to the rigid character of the brackets 11 which attach the device to the chassis of the vehicle, control of the rebound of the weight 25 (or 25a) is dependent entirely upon the action of the housed-in coiled compression springs 30 and 31.

A bleed groove for air passage 34 is formed between the weight 25 and cylinder 17 to provide a pneumatic cushion between the opposite ends of said weight in the cylinder to prevent excessive movement of the weight from one side to the other on its shaft 19.

In Fig. 5 is shown a modification of parts of the structure contained within the housing 12, the ball bearing structures being, in part, dispensed with and a cast weight, fitted in a freely turnable manner within said housing, having end portions which directly bear rotationally and slidably upon the shaft 19. The modified weight 25a shown in this view has a free working fit upon the shaft 19 and within the housing 12. Most of the parts shown in Fig. 5 are constructed in the same manner as in the preceding views and such parts are therefore designated by the same reference numerals. The springs 30 and 31 have their outer ends supported in the same manner, but no special means is provided for seating their inner ends, as that is not deemed essential in this modification.

In both embodiments of the invention the operation is similar. When a sudden lateral movement of the vehicle occurs the weight (25 or 25a) will shift endwise thus compressing one or the other of the springs (30 or 31). Such compressed spring will then exert a reactive force which is directed exactly opposite to the force which causes its compression, thus stabilizing the vehicle against excessive displacement.

Owing to the weight (25 or 25a) being freely rotatable upon the shaft 19 it will not aggravate front-to-rear pitching movements of the vehicle. Otherwise when, for example, the vehicle rapidly has passed over a dip in the roadbed the pitching movement of the vehicle would be aggravated by the rotational inertia of the weight, assuming the latter were made nonrotatably fast to the shaft 19.

In Fig. 2 the double headed arrow 35 indicates the rotary oscillations of the weight (25 or 25a) in relation to the surrounding parts which will be produced by lengthwise oscillatory movements of the vehicle, for example, such movements when caused by passing over dips or rises in the roadbed. A bleed passage 34a is provided in weight 25a as hereinbefore described in Fig. 1.

I claim:

1. In a device for balancing vehicle movements, a tubular housing attached to the chassis of a vehicle with the axis of said housing extending substantially parallel to the axis of rotation of the rear wheels of the vehicle, a cylindrical head secured within each end of said housing, a shaft spanning the distance between said heads and having end portions projecting through and secured to said heads in a radially adjustable manner, said heads having each a central circular aperture dimensioned to allow a clearance for radial adjustment of said shaft a cylindrical weight axially mounted upon said shaft and movable lengthwise of the latter, the diameter of said weight being slightly less than the interior diameter of said housing, the length of said weight being considerably less than the distance between said heads, spring means mounted within said housing and arranged to resist endwise movement of said weight in either direction, and a pair of nuts secured onto each end portion of said shaft, the nuts of each pair clamping said shaft between them in the selected aforesaid radially adjusted position.

2. In a device for balancing vehicle movements, a tubular housing attached to the chassis of a vehicle with the axis of said housing extending substantially parallel to the axis of rotation of the rear wheels of the vehicle, a cylindrical head secured within each end of said housing, a shaft spanning the distance between said heads and having end portions secured substantially concentrically to them, a cylindrical weight axially mounted upon said shaft and movable lengthwise of the latter, the length of said weight being considerably less than the distance between said heads, a compression spring mounted between each end of said weight and one of said heads opposite thereto, said weight normally occupying a position midway between said heads, endwise movement of said weight in either direction from said intermediate position being resisted by one or the other of said springs, and a ball bearing structure interposed between the outer end of each of said springs and the adjacent aforesaid housing head, said ball bearing structures greatly reducing the frictional resistance to the relative rotation of said weight and shaft produced by lengthwise vertical oscillatory movements of the vehicle.

DAVID B. SILVERMAN.

References Cited in the file of this patent

UNITED STATES PATENTS

| Number | Name | Date |
|---|---|---|
| 1,783,348 | Taylor | Dec. 2, 1930 |
| 1,867,708 | Paton | July 19, 1932 |
| 2,155,130 | Hanel | Apr. 18, 1939 |
| 2,545,578 | Hanel | Mar. 20, 1951 |
| 2,618,492 | Singer | Nov. 18, 1952 |

FOREIGN PATENTS

| Number | Country | Date |
|---|---|---|
| 271,285 | Switzerland | Oct. 15, 1950 |
| 481,654 | Great Britain | Mar. 15, 1938 |